(12) United States Patent
Assuncao et al.

(10) Patent No.: US 9,590,875 B2
(45) Date of Patent: Mar. 7, 2017

(54) CONTENT DELIVERY INFRASTRUCTURE WITH NON-INTENTIONAL FEEDBACK PARAMETER PROVISIONING

(71) Applicant: International Business Machines Corporation, Armonk, NY (US)

(72) Inventors: Marcos Dias De Assuncao, Sao Paulo (BR); Fernando Luiz Koch, Sao Paulo (BR); Marco Aurelio Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 13/872,217

(22) Filed: Apr. 29, 2013

(65) Prior Publication Data

US 2014/0325068 A1 Oct. 30, 2014

(51) Int. Cl.

| | |
|---|---|
| *G06F 15/173* | (2006.01) |
| *H04L 12/24* | (2006.01) |
| *G06F 9/50* | (2006.01) |
| *G06F 3/01* | (2006.01) |
| *H04L 12/26* | (2006.01) |
| *H04L 29/08* | (2006.01) |

(52) U.S. Cl.
CPC .......... *H04L 41/5096* (2013.01); *G06F 3/011* (2013.01); *G06F 9/5072* (2013.01); *H04L 41/082* (2013.01); *G06F 2209/5019* (2013.01); *H04L 41/147* (2013.01); *H04L 41/5019* (2013.01); *H04L 43/0817* (2013.01); *H04L 67/30* (2013.01); *Y02B 60/142* (2013.01); *Y02B 60/167* (2013.01)

(58) Field of Classification Search
CPC ....................................................... H04L 67/30
USPC ................................................. 709/226, 223
See application file for complete search history.

(56) References Cited

U.S. PATENT DOCUMENTS

| | | | |
|---|---|---|---|
| 6,115,640 | A | 9/2000 | Tarumi |
| 8,031,181 | B2 | 10/2011 | Rosenberg et al. |
| 8,059,104 | B2* | 11/2011 | Shahoian ............... G06F 1/1616 178/18.03 |
| 8,311,577 | B2* | 11/2012 | Bivens .............. H04M 1/72519 455/556.1 |

(Continued)

OTHER PUBLICATIONS

Feitelson, Parallel job scheduling—a status report. Proceedings of JSSPP. 2005.

(Continued)

*Primary Examiner* — David Lazaro
*Assistant Examiner* — Marie Georges Henry
(74) *Attorney, Agent, or Firm* — Law Office of Charles W. Peterson, Jr.; Louis J. Percello, Esq.

(57) ABSTRACT

A shared resource system, method of managing shared resources and services and a computer program product therefor. Service provider computers (e.g., cloud computers) including a resource management system, selectively make resource capacity available to networked client devices. Stored resource configuration parameters are collected from non-intentional haptic input to mobile client devices. The resource management system provisions resources for mobile clients based on resource configuration parameters. Non-intentional haptic input is provided as non-intentional gesture feedback, and evaluated to selectively update stored resource configuration parameters.

25 Claims, 7 Drawing Sheets

(56) References Cited

U.S. PATENT DOCUMENTS

| | | | |
|---|---|---|---|
| 2009/0133064 A1 | 5/2009 | Maruyama et al. | |
| 2009/0183078 A1 | 7/2009 | Clement et al. | |
| 2010/0317400 A1* | 12/2010 | Bivens | H04M 1/72519 455/556.1 |
| 2011/0102145 A1* | 5/2011 | Park | G06F 3/016 340/6.1 |
| 2011/0161001 A1* | 6/2011 | Fink | G01C 21/3492 701/533 |
| 2012/0154294 A1* | 6/2012 | Hinckley | G06F 1/1649 345/173 |
| 2014/0018166 A1* | 1/2014 | Guild | G06F 3/017 463/31 |
| 2015/0116205 A1* | 4/2015 | Westerman | G06F 3/016 345/156 |

OTHER PUBLICATIONS

Takefusa et al., A Study of Deadline Scheduling for Client-Server Systems on the Computational Grid. Proceedings of HPDC. 2001.

Rudolph Emil Kalman, A New Approach to Linear Filtering and Prediction Problems, Transactions of the ASME—Journal of Basic Engineering, vol. 82, Series D, pp. 35-45, 1960.

Williams et al , Haptics-Augmented Engineering Mechanics Educational Tools. World Transactions on Engineering and Technology Education vol. 6, No. 1, 2007.

Joung et al., Tactile Hand Gesture Recognition through Haptic Feedback for Affective Online Communication. HCI International 2011.

MacLean, Designing with Haptic Feedback, Proceedings of IEEE Robotics and Automation on Symposium on Haptic Feedback. (ICRA) 2000.

* cited by examiner

| PROFILE | GEST | MEANING |
|---------|------|---------|
| A | 1 | LOAD ↑ |
| A | 2 | LOAD ↓ |
| B | 1 | NEUTRAL |
| B | 2 | LOAD ↓↓ |

| GESTURE | | |
|---|---|---|
| 1 | TAP SOFT | ▪ |
| 2 | TAP HARD | ○ |
| 3 | SLIP LEFT | ← |
| 4 | SLIP RIGHT | → |
| 5 | ZOOM HOR | ↔ |
| 6 | ZOOM VERT | ↕ |
| 7 | ZOOM INCL | ⤢ |

| USER | PROFILE |
|------|---------|
| a | A |
| b | A |
| c | B |
| d | C |

| USER | FB# | EVAL GEST |
|------|-----|-----------|
| a | 1 | ↑ |
| a | 2 | ↓ |
| b | 1 | NEUTRAL |
| ... | | |

| GROUP | EVAL |
|-------|------|
| G1 | ↑ |
| G1 | ↓ |
| G2 | NEUTRAL |
| ... | |

| GROUP | PROFILE |
|-------|---------|
| G1 | A |
| G1 | A |
| G2 | B |
| G3 | C |
| ... | ... |

Fig. 6F

152  For each hosted service *s*:
154  *curr_resource_allocation* <- get current allocation for service *s*
156  *predicted_demand* <- predict the resource demand for the next time horizon *h*
158  *last_error* <- *curr_resource_allocation* - *predicted_demand* of previous time horizon
160  Adjust *predicted_demand* considering *last_error* or the error of past *x* time horizons
162  If a percentage of users changed their interaction patterns in the past *x* time horizons, then:
164  Adjust *predicted_demand* considering the user interaction over the past *x* time horizons
166  If *predicted_demand* > *curr_resource_allocation*, then:
168  Identify allocation parameters that need to be changed and create report
170  Display report to the system administrator

Fig. 7

CONTENT DELIVERY INFRASTRUCTURE WITH NON-INTENTIONAL FEEDBACK PARAMETER PROVISIONING

BACKGROUND OF THE INVENTION

Field of the Invention

The present invention is related to allocating shared resources and more particularly to automatically adjusting resource allocation and automatic demand prediction in real time for highly interactive applications based on non-intentional haptic feedback.

Background Description

Typically, provisioning and managing shared information technology (IT) and especially cloud infrastructure resources involves scheduling jobs according to deadlines, allocating resources to scheduled jobs, setting job priorities and predicting load and performance to maximize utilization. Job scheduling management is described, for example, by Feitelson, "Parallel job scheduling—a status report," *Proceedings of JSSPP,* 2005; and by Takefusa et al. "A Study of Deadline Scheduling for Client-Server Systems on the Computational Grid," *Proceedings of HPDC,* 2001.

In allocating resources and, further, in determining expected consolidation opportunities, factors considered may include, for example, resource utilization, application response time and energy consumption. Load estimates indicate the typical predicted user load, which varies with actual use over time, depending on how each user interacts with a respective application. Several well known load prediction techniques are available, some of which consider user device interactions independent of whether allocation may be improved. Typically, however, service providers have monitored device requests on the provider (server) side to measure the degree of user interaction with cloud based applications. Utilization estimates project how many users are expected to utilize a particular service over time.

While these techniques may work well with stationary or for pseudo-stationary clients, client mobility can render these techniques ineffective. Mobile client devices typically run local applications that manage digital content consumption. State of the art mobile devices, such as stand alone, handheld multimedia players, tablet computers, personal digital assistants (PDAs) and smart phones have increasingly become major consumers of remotely stored and/or streaming cloud content.

Thus, there is a need for improved resource allocation strategies that consider feedback from mobile users; and more particularly, there is a need for capturing and using mobile user feedback for more accurately determining service usage tendencies and for more accurately determining when peak demand is likely to occur.

SUMMARY OF THE INVENTION

A feature of the invention is resource allocation and adjustment based on mobile user responses;

Another feature of the invention is resource allocation adjustment on the fly for highly interactive applications based on real time user responses;

Yet another feature of the invention is automatic resource allocation adjustment and demand prediction for highly interactive applications based on real time non-intentional haptic feedback, changing estimated/expected mobile user average demand on the fly.

The present invention relates to a shared resource system, method of managing shared resources and services and a computer program product therefor. Service provider computers (e.g., cloud computers) including a resource management system, selectively make resource capacity available to networked client devices. Stored resource configuration parameters are collected from non-intentional haptic input to mobile client devices. The resource management system provisions resources for mobile clients based on resource configuration parameters. Non-intentional haptic input is provided as non-intentional gesture feedback, and evaluated to selectively update stored resource configuration parameters.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service. Moreover, the present invention provides for client self-monitoring for adjusting individual resource allocation and configuration on-the-fly for optimized resource allocation in real time and with operating costs and energy use minimized.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources, sometimes referred to as a hypervisor, where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
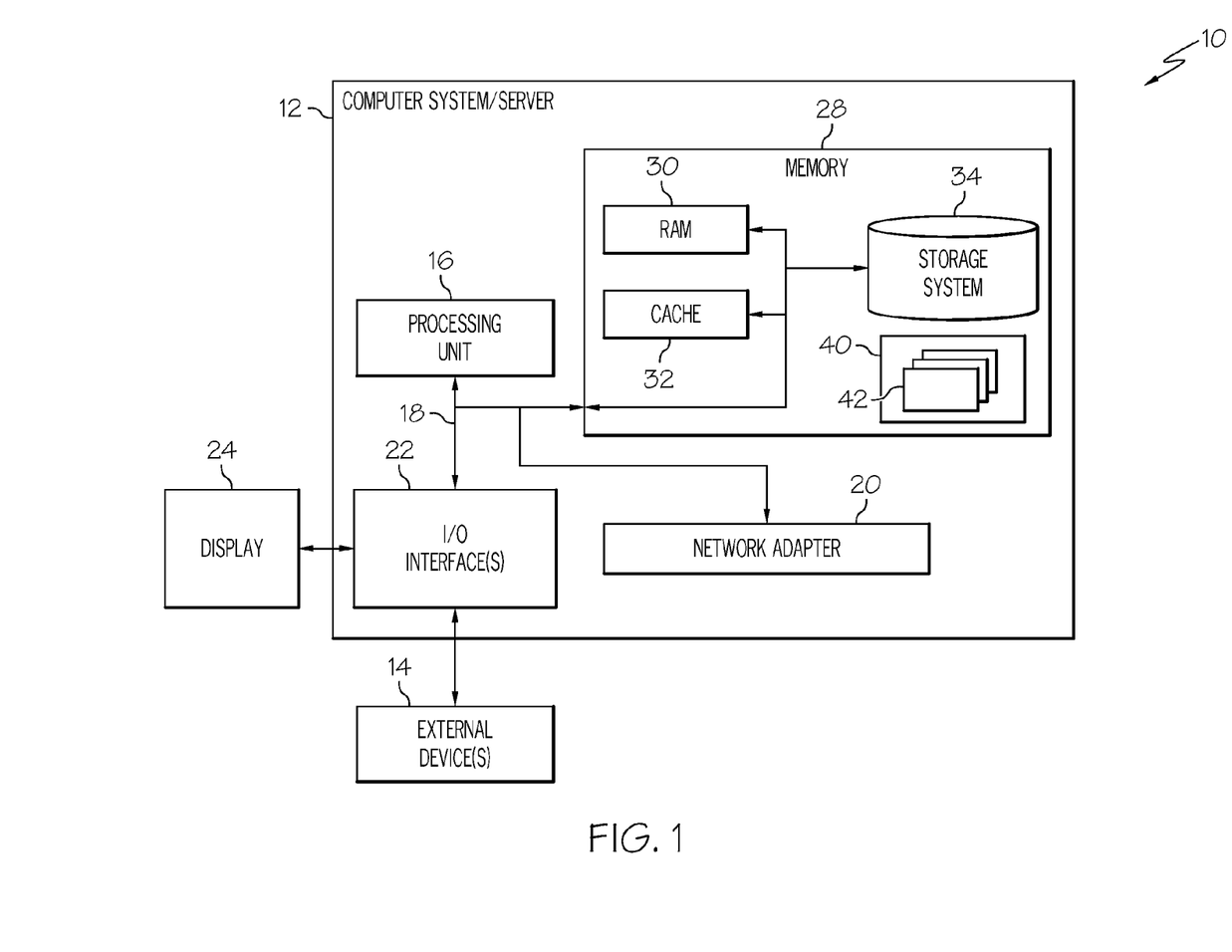
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
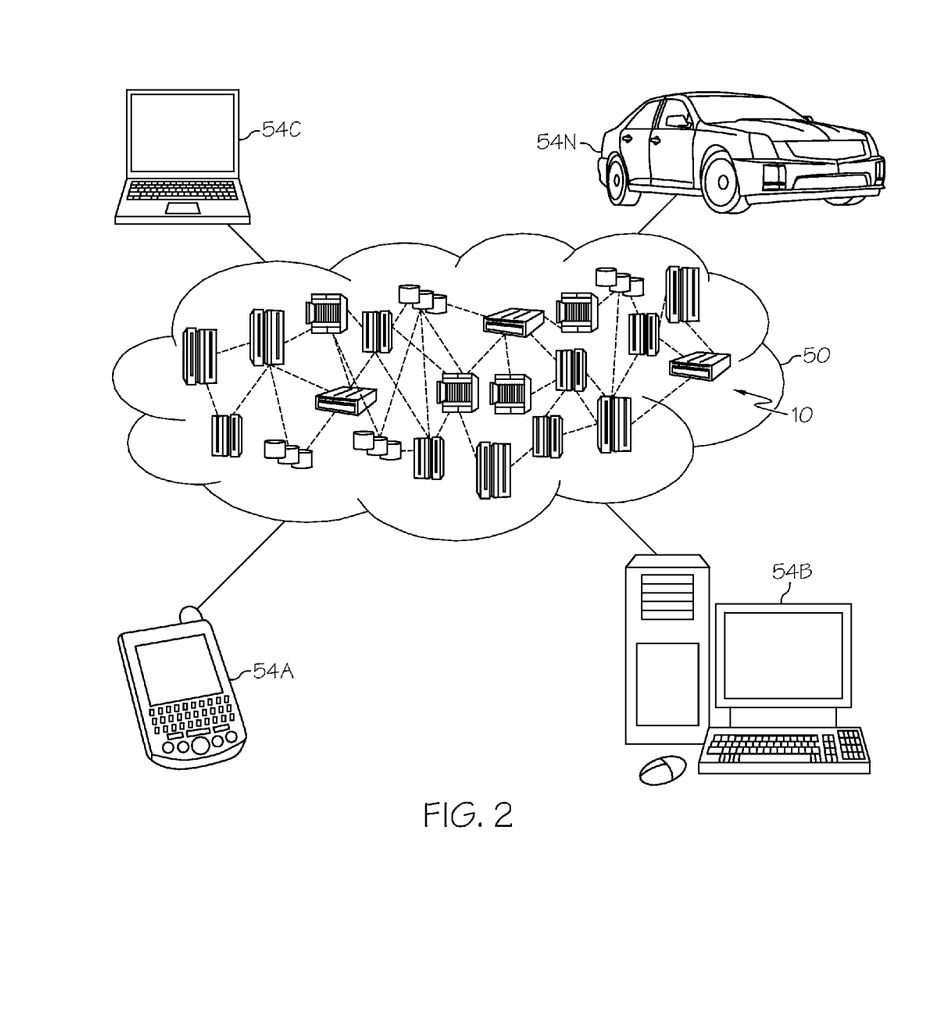
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
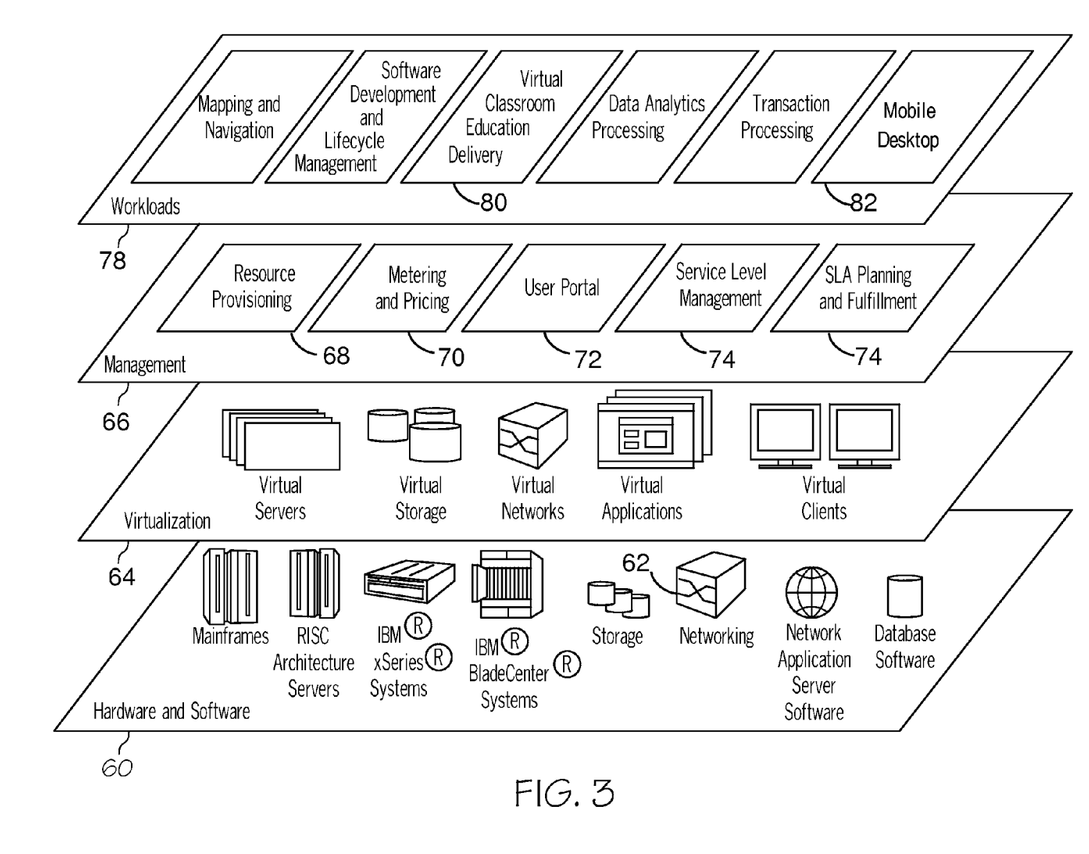
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components 62. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 64 provides an abstraction layer from which the following examples of virtual entities may be provided: virtual servers; virtual storage; virtual networks, including virtual private networks; virtual applications and operating systems; and virtual clients.

In one example, management layer 66 may provide the functions described below. Resource provisioning 68 provides dynamic procurement of computing resources and other resources that are utilized to perform tasks within the cloud computing environment. Metering and Pricing 70 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 72 provides access to the cloud computing environment for consumers and system administrators. Service level management 74 provides cloud computing resource allocation and management such that required service levels are met. Service Level Agreement (SLA) planning and fulfillment 76 provide pre-arrangement for, and procurement of, cloud computing resources for which a future requirement is anticipated in accordance with an SLA.

Workloads layer 78 provides examples of functionality for which the cloud computing environment may be utilized. Examples of workloads and functions which may be provided from this layer include: mapping and navigation; software development and lifecycle management; virtual classroom education delivery 80; data analytics processing; transaction processing; and Mobile Desktop 82.

Figure 4A:
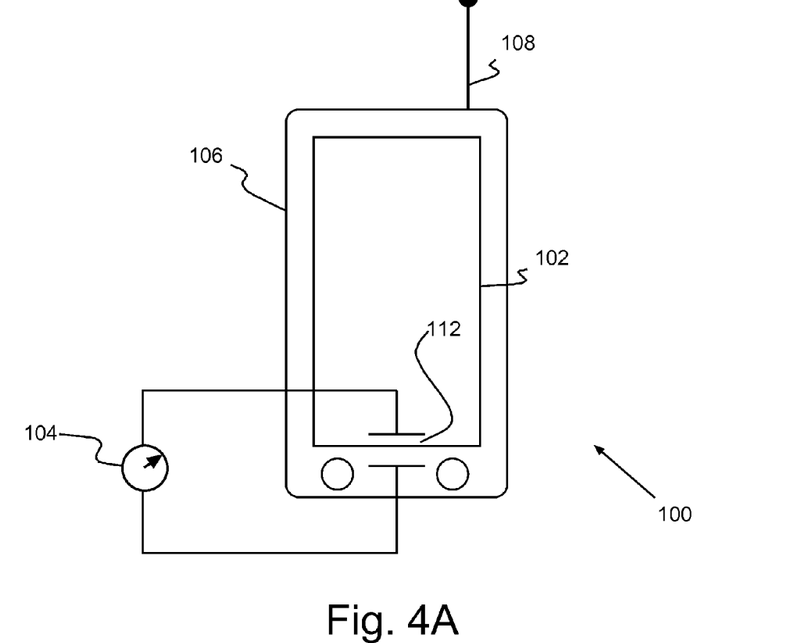
FIGS. 4A-B show an example of a haptic enabled mobile or hand held device cloud computing node and interface according to a preferred embodiment of the present invention.
Figure 4B:
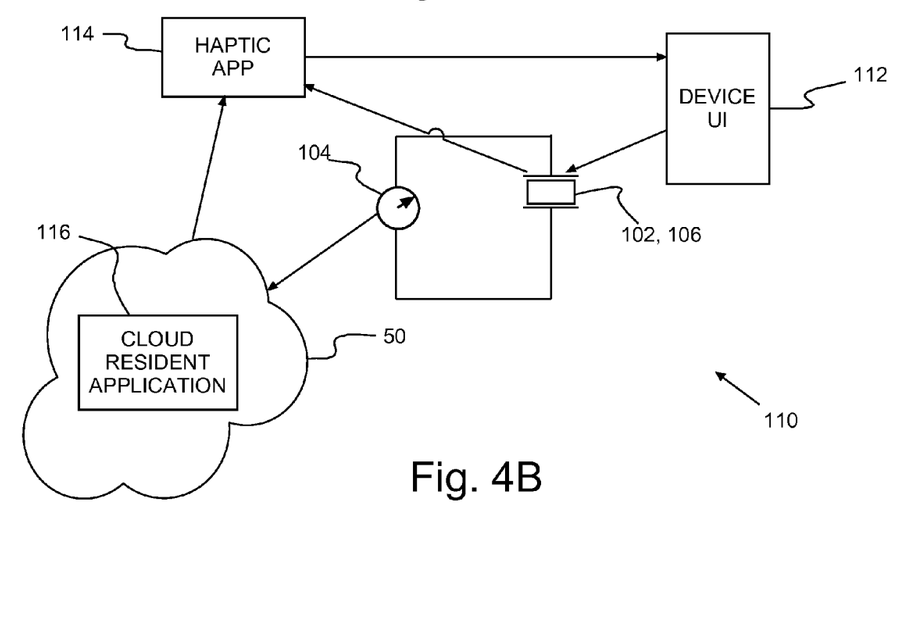

FIGS. 4A-B show an example of a mobile or hand held device 100 operating as a cloud computing node 10 with a haptic enabled interface 110 according to a preferred embodiment of the present invention. Current and next generation state of the art mobile devices manufacturers are equipping new devices 100 with haptic technology, e.g., 110. A preferred mobile device 100 is capable of receiving and interpreting haptic and tactile interactions in cooperation with haptic enabled cloud infrastructure of FIGS. 1-3.

In this example, the preferred hand held device 100 (e.g., a tablet computer or a smart phone such as cellular telephone 54A) includes touch screen 102 as an input and output peripheral (I/O). Embedded haptic technology includes one or more tactile sensors 104 that measure forces exerted on the device user interface (UI) 112, e.g., on touch screen 102 and between touch screen 102 and housing 106. The user interface 112 is resident in internal device electronics, e.g., in housing 106. The device 100 consumes services hosted on cloud computers 10 and communicates with management services from the management layer 66 through Application Programming Interfaces (APIs, e.g., in user portal 72) over a network (e.g., 62), wirelessly 108 in this example.

In addition to sensing intentional user input, haptic sensors 104 sense non-intentional input, referred to herein as "non-intentional user feedback." The haptic interface 110 receives and monitors incidental haptic input from the preferred hand held device 100 in combination and coordination with haptic enabled cloud infrastructure. Non-intentional user feedback data passes back through management services accessible via APIs, where one or more shared systems 10 determine the degree of user interaction, and/or infer user excitement experienced with a corresponding application or service.

Preferably, two primary components or modules cooperate with the haptic enabled interface 110 in sensing and interpreting non-intentional user feedback, a haptic app 114 and a transparent, cloud haptic application 116. The preferred haptic app 114 is resident on the device 100. The haptic app 114 may be installed in Mobile Desktop 82 in cloud computing environment 50. Correspondingly, the cloud haptic application 116 is active in the cloud, e.g., on one of the cloud computers 10. The cloud haptic application 116 provides cloud services and receives and interprets non-intentional input. The cloud haptic application 116 further receives notifications indicating how the device 100 user interacts with the resident haptic app 114.

Typically, mobile applications or apps are considered as belonging to one of two categories, highly interactive apps and limited interaction apps. A highly interactive app is an app that requires substantial user interaction, e.g., by frequently touching a mobile device screen 102. This touching may include selecting objects, dragging objects, and moving the device, e.g., rotating the device 100. For example, a game or other app may require interaction using a touch screen 102, accelerometers, haptic sensors 104 and tactile sensors. A limited interaction app requires very little sensor input, e.g., web browsing. The present invention automatically adjusts resource demand prediction in real time, changing estimated/expected per user average demand on the fly, based on historic increases in interaction over a past time horizon. App interaction type defines the degree of adjustment (increase or reduction) of resource demand for each user. Overall service resource prediction is iterative with a new iteration after each average user demand update.

So, the haptic interface 110 passes/feeds back data from haptic sensors 104 for tactilely sensing and measuring user force on the touch screen 102 through the haptic app 114 to the cloud haptic application 116. The cloud haptic application 116 monitors haptic activity feedback data from sensors 104, collecting and reporting non-intentional haptic feedback to cloud managed resources 50, where the feedback data may be stored, e.g., in storage 34. The cloud haptic application 116 may also interpret sense signals from sensors 104 as response feedback for additional predictive resource allocation information.

Thus, the preferred haptic interface 110 and provisioned cloud services 50 sense and interpret user originated physical interaction including, for example, gestures, tactile manipulation, surface contact, zooming actions and tapping. The provisioned cloud services 50 may classify haptic activities as utilization events and individually analyze feedback, as a sequence of events, and/or collectively as events from a group of users. For example, the group may be a community of students sharing IT infrastructure, e.g., in a virtual classroom education delivery 80, delivering digital educational content and educational applications.

In particular, the preferred haptic interface 110, haptic app 114 and haptic application 116 may monitor a group of users interacting with digital content material on touch screens 102, collecting group feedback. Management layer 66 may service haptic enabled mobile devices 100, through special purpose modules or, through typical, normally provided modules that are modified for haptic feedback analysis. The analysis results provide demand prediction for determining resource provisioning parameters and monitoring utilization loads.

Metering and Pricing 70 in FIG. 3, for example, may analyze how a user group interacts with running applications for a given resource allocation parameter set, e.g., in storage 34, based on collected non-intentional feedback. So, for example, Metering and Pricing 70 may estimate the probability of a peak load in near- to middle-range term; receive and store information about user feedback from mobile devices 100; and analyze the information to create and update user and group profiles and to identify application use trends.

Likewise, SLA planning and fulfillment 76 may include, for example, predicting demand based on current resource demand and feedback information determined by the feedback analyzer, e.g., Metering and Pricing 70. Analyzing feedback predicts resource demands over a given time horizon from which SLA planning and fulfillment 76 can recommend (e.g., to system administrators) parameter adjustments for resource provisioning to provide reports, and for identifying parameters to adjust to cope with the service demands in delivering content to mobile devices. In addition, preferably, provisioning-parameter information are tuned automatically for the number and characteristics of resources allocated to a given service. Service level management 74 monitors the current resource utilization to determine past load prediction accuracy; and corrects eventual mapping issues in mapping user gestures to load-change characteristics.

A preferred mobile device 100 may include a module responsible for collecting information about how a user interacts with active applications. The data from feedback sensor(s) 104 quantify the level of force to the screen 102 and/or zoom-in, zoom-out gestures. The haptic app 114 provides collected haptic data to the cloud 50 to facilitate efficiently hosting services and applications, and delivering digital content and services to the preferred mobile device(s) 100.

Figure 5:
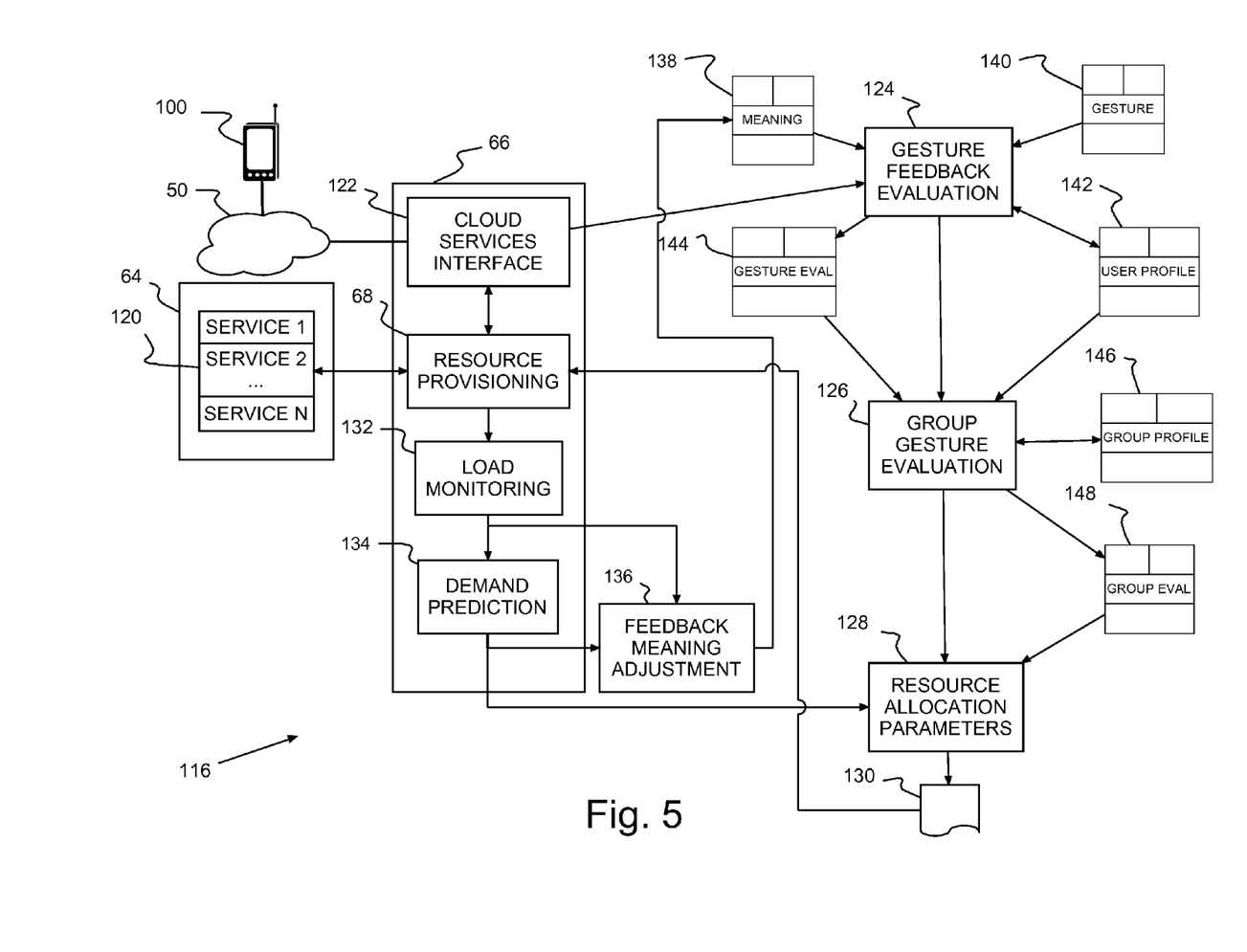
FIG. 5 shows an example of data flow through cloud managed resources provisioned for a preferred hand held device, capable of receiving and interpreting haptic and tactile interactions operating through a preferred haptic interface.
Figure 6A:
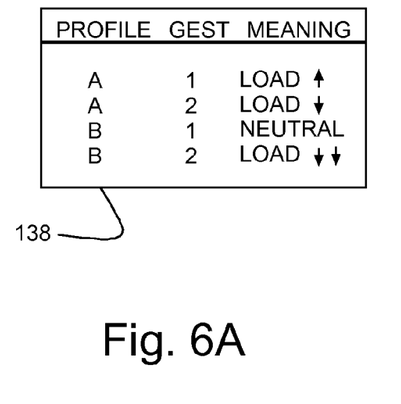
FIGS. 6A-F show examples of tables used in feedback interpretation for the data flow.
Figure 6B:
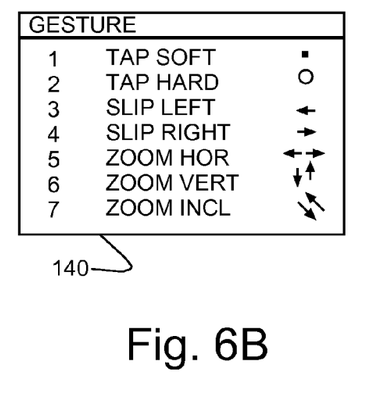
Figure 6C:
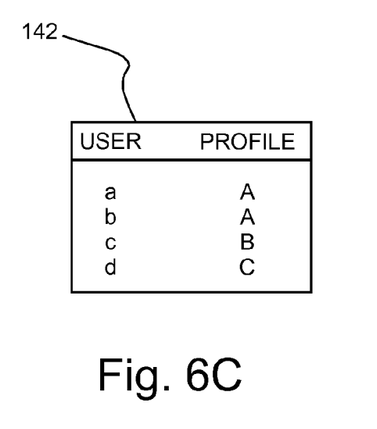
Figure 6D:
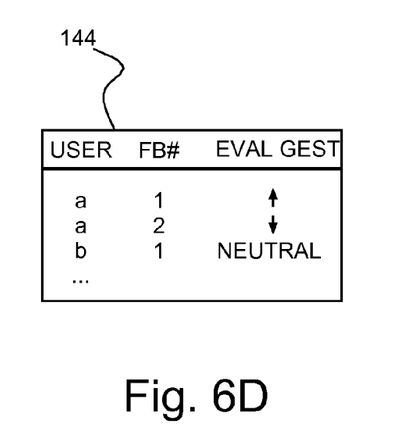
Figure 6E:
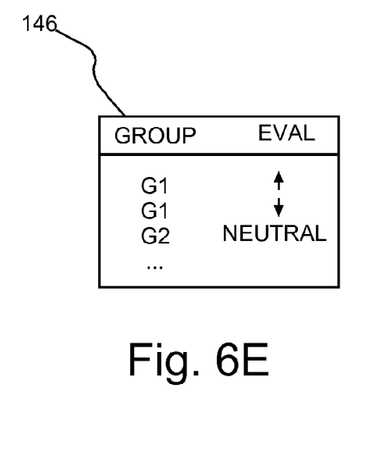
Figure 6F:
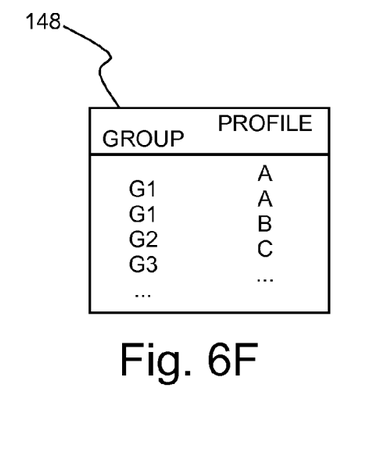

FIG. 5 shows an example of haptic application 116 data flow through cloud managed resources of FIGS. 1-3 provisioned for a preferred hand held device 100 of FIGS. 4A-4B, with identical features labeled identically. A resource management system 66 (e.g., on a server 10) provisions 68 content services 120 (user applications) in virtualization layer 64 for preferred mobile device(s) 100. Cloud services interface 120 receives user-interaction information, e.g., through user portal or APIs 72. The preferred mobile devices 100 monitor for, and report, non-intentional user feedback for evaluation 124, e.g., gestures collected by sensors 104.

A gesture evaluator 124 evaluates feedback information for each mobile device to assess and select gesture sequences impacting resource consumption and system utilization. A group feedback evaluator 126 collects individual feedback evaluation results for groups and evaluates the collections to assess how different group behaviors influence system load, near or middle term. Then, a parameter extractor 128 extracts resource allocation parameters from feedback evaluation results. The resulting gesture feedback parameters 130 are returned to the resource management system 66 and stored for subsequent resource provisioning 68.

A load monitoring unit 132 continually monitors actual load on provisioned resources. A demand predictor 134 predicts resource demand for each hosted service 120. A gesture translation adjuster 136 compares actual load (from monitoring 132) in real time against the predicted 134 demand. If the real time demand matches predictions, haptic data are correctly translated using gesture interpretation table 138. Otherwise, one or more translation meanings need adjustment.

FIGS. 6A-F show examples of tables used in feedback interpretation for the haptic application 116 data flow, including gesture interpretation table 138. The gesture interpretation table 138 maps gestures to potential influence on load each gesture may have for a service. Gesture evaluator 124 evaluates user feedback markers based on a gesture table 140 with recognized gestures with respective user identifications, and on a user profile table 142 with profile information for each user based on the current gesture interpretation table 138. Gesture evaluator 124 generates a gesture evaluation table 144, that indicates what user gestures mean to the load of services being used and whether the gestures indicate a peak demand. Gesture evaluator 124 also selectively updates the user profile table 142.

Group feedback evaluator 126 combines group profiles from a group profile table 146 and user profiles 142 to produce a collective load table 148 based on feedback information in gesture evaluation table 144. Thus, the group profile table 146 includes profile information for each group. The collective load table 148 indicates how different group behaviors might influence system load in the near or middle-range term.

Resource provisioning 68 acts on previously made service resource allocations, adjusting according to expected demand increases or decreases. As noted hereinabove, load monitor 132 continually monitors actual load on provisioned resources. Further, monitored results are compared 136 against predicted resource demand 134 of each hosted service 120 and compared. The comparison establishes whether to adjust gesture interpretation table 138 meanings, i.e., whether to correct/adjust expected impact in identified demand need surges.

Figure 7:
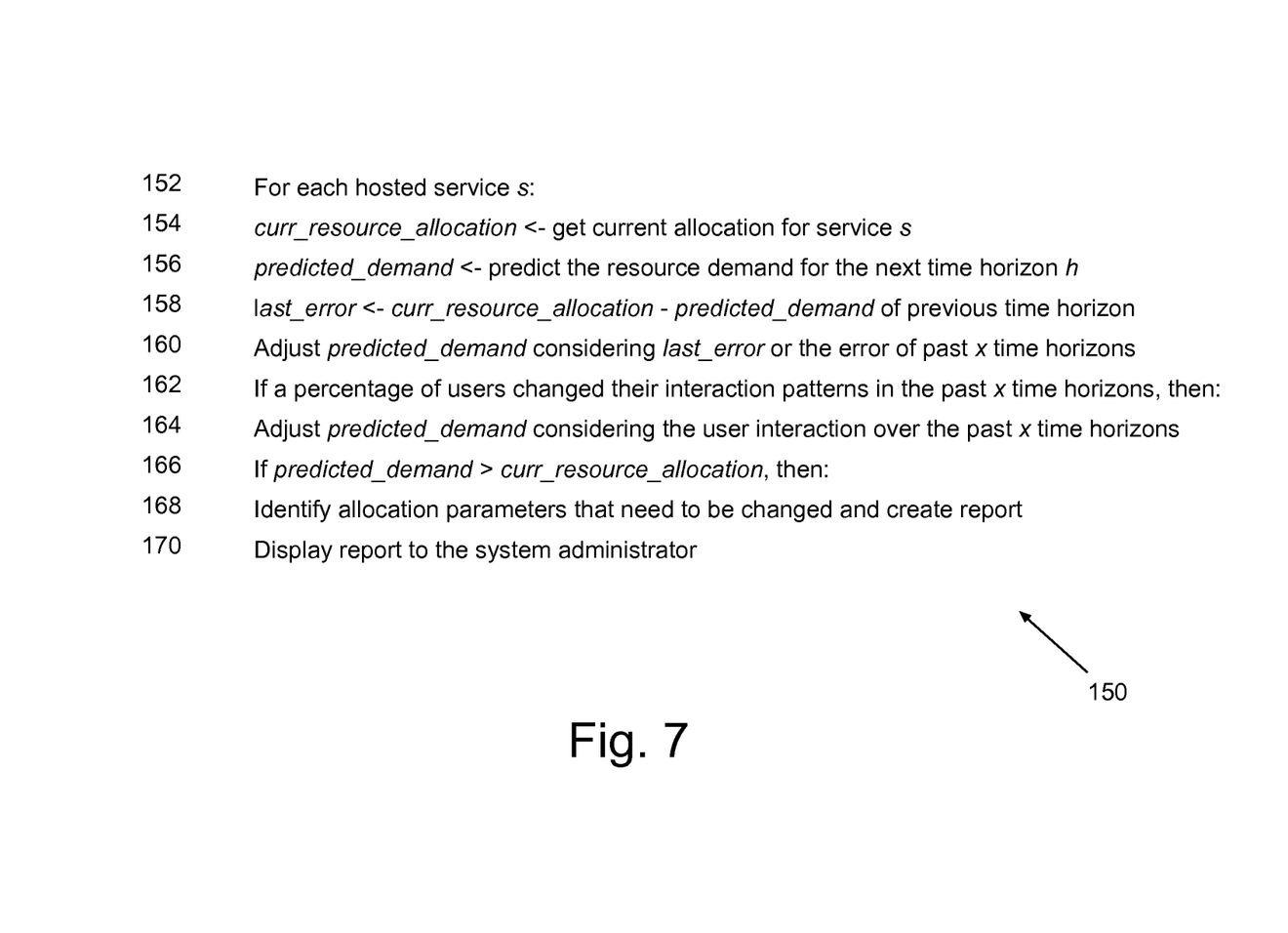
FIG. 7 shows an example of pseudo-code for iteratively adjusting demand prediction for mobile devices based on non-intentional haptic feedback.

FIG. 7 shows an example of pseudo-code for iteratively adjusting demand prediction 150 for mobile devices (e.g., 100 in FIGS. 4A-B) based on non-intentional haptic feedback. In each iteration, one hosted service (s) 152 is selected and for that service, an allocation variable (curr_resource_allocation) is set 154 to the current allocation. Based on that current allocation, resource demand for the next time horizon (h) is predicted 156 (predicted_demand). The prediction error (last_error) 158 for previous time horizon is determined as the difference between the current allocation and predicted demand (curr_resource_allocation−predicted_demand). The predicted resource demand is adjusted 160 over x time horizons. Thus, the adjustment may be based solely on the most recent error (x=1), or for a less volatile adjustment, over a selected number n of time horizons (x=n). If interaction patterns have changed 162 for a number of service users over the past x time horizons, the predicted resource demand is further adjusted 164 in consideration of user interaction with those service users. If the predicted demand exceeds the current allocation 166, the predicted demand causes an initial over-allocation, and a report is created 168 identifying allocation parameters that need to be changed. Finally, the report is made available 170, e.g., emailed, texted, displayed or printed to a system administrator.

Thus, the present invention uses non-intentional user feedback to refine resource demand prediction. Estimating Information Technology (IT) resources demand may be done, for example, using time series analysis and Kalman filters. Series analysis is described, for example, by Box et al., *Time Series Analysis: Forecasting and Control*, Prentice-Hall International, Inc., 3rd edition, 1994. Kalman filters are described, for example, by Kalman. "A New Approach to Linear Filtering and Prediction Problems," *Transactions of the ASME—Journal of Basic Engineering*, Vol. 82, Series D, pp. 35-45, 1960.

Accordingly, application of the present invention improves resource allocation efficiency based on consideration of non-intentional feedback in load prediction. Further, the present invention pro-actively recommends resource allocation adjustments on the fly for highly interactive applications in response to the non-intentional feedback. Moreover, the present invention automatically allocates and adjusts resources and demand prediction for highly interactive applications in real time based on non-intentional haptic feedback, changing estimated/expected per user average demand on the fly.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A shared resource system comprising:
   one or more service provider computers including a resource management system, said one or more service provider computers selectively making resource capacity available;
   a network, client devices connecting to said one or more service provider computers over said network;
   a resource configuration parameter store storing resource configuration parameters collected from non-intentional haptic input in intentional gestures to mobile client devices, said resource management system provisioning resources for said mobile client devices responsive to stored said resource configuration parameters, said non-intentional haptic input being provided to said resource management system as non-intentional gesture feedback; and
   means for evaluating non-intentional gesture feedback from said mobile devices, selectively updating stored resource configuration parameters, and adjusting provisioned resources in real time based on the updated resource configuration parameters.

2. A shared resource system as in claim 1, wherein said resource management system comprises:
- a user interface for interfacing non-intentional gesture feedback from said mobile client devices;
- a resource provisioning unit provisioning services requested for said mobile client devices responsive to said stored resource configuration parameters, said one or more service provider computers hosting said provisioned services;
- a load monitoring unit monitoring actual load from hosted said services;
- a demand prediction unit predicting resource demand for each hosted service; and
- a feedback meaning adjustment unit comparing actual load against predicted resource demand, said feedback meaning adjustment unit adjusting gesture translations associated with non-intentional gestures responsive to comparison results.

3. A shared resource system as in claim 1, wherein said means for evaluating said non-intentional gesture feedback comprises:
- a gesture evaluator selecting gesture sequences responsive to said non-intentional gesture feedback;
- a group feedback evaluator collectively evaluating selected gesture sequences from mobile devices identified with a group; and
- a parameter extractor extracting resource allocation parameters from feedback evaluation results.

4. A shared resource system as in claim 3, wherein said gesture evaluator evaluates non-intentional feedback information for individual mobile devices to assess and select said gesture sequences impacting resource consumption and system utilization.

5. A shared resource system as in claim 3, wherein said group feedback evaluator collects individual feedback evaluation results for groups and evaluates the collections to assess how different group behaviors influence system load.

6. A shared resource system as in claim 1, further comprising a plurality of client devices connected to said network and networked with said one or more service provider computers, one or more of said plurality of client devices being a mobile device including a haptic capable user interface receiving non-intentional haptic input to said mobile device.

7. A shared resource system as in claim 6, wherein said one or more service provider computers are cloud computers operating in a cloud environment, said plurality of client devices are cloud client devices, and said non-intentional haptic input quantifies interaction with active applications.

8. A shared resource system as in claim 7, wherein said non-intentional haptic input further comprises physical interaction with said mobile device including gestures, tactile manipulation, surface contact, zooming actions and tapping.

9. A method of managing allocated resources, said method comprising:
- hosting services provisioned on one or more provider computers for a mobile device;
- receiving feedback responsive to non-intentional haptic input in intentional gestures to said mobile device;
- determining whether received non-intentional said feedback indicates whether actual system load matches expected load considered in provisioning for said hosted services; and
- adjusting load prediction for any service where actual load exceeds expected load, each hosted service being provisioned subsequently responsive to the adjusted load prediction.

10. A method of managing allocated resources as in claim 9, wherein determining whether non-intentional feedback matches actual system load is done for each hosted service and comprises:
- evaluating non-intentional feedback data for each user of said hosted services;
- evaluating non-intentional feedback data for user groups using said hosted services; and
- generating load prediction parameters for said hosted services, said generated load prediction parameters being used to adjust load prediction parameters for provisioning said hosted services.

11. A method of managing allocated resources as in claim 10, further comprising:
- monitoring said hosted services for actual system load; and
- predicting load for said hosted services responsive to said load prediction parameters;
- adjusting feedback translated meaning responsive to said actual system load and said load prediction.

12. A method of managing allocated resources as in claim 9, wherein determining whether non-intentional feedback matches actual system load is done for each hosted service and adjusting load prediction comprises:
- selecting one of said hosted services;
- comparing the current resource allocation against a predicted load over a prior selected time period for the selected said hosted service;
- adjusting load prediction for said selected hosted service responsive to any comparison difference over a selected number of selected time periods;
- selectively adjusting load prediction for said selected hosted service responsive to non-intentional said feedback over said selected number of selected time periods; and
- selecting another of said hosted services and returning to compare the current resource allocation against predicted load over for the selected said hosted service until all said hosted service are selected.

13. A method of managing allocated resources as in claim 12, wherein determining whether non-intentional feedback matches further comprises:
- determining whether predicted load exceeds current resource allocation;
- identifying allocation parameters changes responsive to the amount predicted load exceeds current resource allocation; and
- providing an indication of allocation parameter changes to meet load prediction.

14. A method of managing allocated resources as in claim 9, wherein said allocated resources are cloud resources, one or more provider computers are cloud computers operating in a cloud environment, said mobile device is a cloud client device, and said haptic feedback comprises non-intentional input to said mobile device.

15. A computer program product for managing allocated cloud resources, said computer program product comprising a non-transitory computer usable medium having computer readable program code stored thereon, said computer readable program code causing a computer executing said code to:
- host services provisioned on one or more cloud computers for a mobile device;

receive feedback responsive to non-intentional haptic input in intentional gestures to said mobile device;
  determine whether received non-intentional said feedback indicates whether actual system load matches expected load considered in provisioning said hosted services; and
  adjust load prediction for any service where actual load exceeds expected load, each hosted service being provisioned subsequently responsive to the adjusted load prediction.

16. A computer program product for managing allocated cloud resources as in claim 15, wherein determining whether non-intentional feedback matches actual system load is done for each hosted service and causes said computer executing said code to:
  evaluate non-intentional feedback data for each user of said hosted services;
  evaluate non-intentional feedback data for user groups using said hosted services; and
  generate load prediction parameters for said hosted services, and use said generated load prediction parameters to adjust load prediction parameters for provisioning said hosted services.

17. A computer program product for managing allocated cloud resources as in claim 16, further causing said computer executing said code to:
  monitor said hosted services for actual system load; and
  predict load for said hosted services responsive to said load prediction parameters;
  adjust feedback translated meaning responsive to said actual system load and said load prediction.

18. A computer program product for managing allocated cloud resources as in claim 15, wherein determining whether non-intentional feedback matches actual system load is done for each hosted service and adjusting load prediction causes said computer executing said code to:
  select one of said hosted services;
  compare the current resource allocation against a predicted load over a prior selected time period for the selected said hosted service;
  adjust load prediction for said selected hosted service responsive to any comparison difference over a selected number of selected time periods;
  selectively adjust load prediction for said selected hosted service responsive to non-intentional said feedback over said selected number of selected time periods; and
  select another of said hosted services and return to compare the current resource allocation against predicted load over for the selected said hosted service until all said hosted service are selected.

19. A computer program product for managing allocated cloud resources as in claim 18, wherein determining whether non-intentional feedback matches further causes said computer executing said code to:
  determine whether predicted load exceeds current resource allocation;
  identify allocation parameters changes responsive to the amount predicted load exceeds current resource allocation; and
  provide an indication of allocation parameter changes to meet load prediction.

20. A computer program product for managing allocated cloud resources, said computer program product comprising a non-transitory computer usable medium having computer readable program code stored thereon, said computer readable program code comprising:
  computer readable program code means for managing one or more cloud provider computers selectively making resource capacity available;
  computer readable program code means for receiving non-intentional gesture feedback in intentional gestures from haptic input to mobile client devices;
  computer readable program code means for storing resource configuration parameters collected from gesture feedback;
  computer readable program code means for provisioning resources for mobile client devices responsive to stored said resource configuration parameters; and
  computer readable program code means for evaluating non-intentional gesture feedback from said mobile devices, selectively updating stored resource configuration parameters, and adjusting provisioned resources in real time based on the updated resource configuration parameters.

21. A computer program product for managing allocated cloud resources as in claim 20, said computer readable program code means for managing comprising:
  computer readable program code means for interfacing non-intentional gesture feedback from said mobile client devices;
  computer readable program code means for provisioning services requested for said mobile client devices responsive to said stored gesture feedback parameters;
  computer readable program code means for hosting said provisioned services;
  computer readable program code means for monitoring actual load from hosted said services;
  computer readable program code means for predicting resource demand for each hosted service; and
  computer readable program code means for comparing actual load against predicted resource demand, and adjusting gesture translations associated with non-intentional gestures responsive to comparison results.

22. A computer program product for managing allocated cloud resources as in claim 20, said computer readable program code means for evaluating said non-intentional gesture feedback comprises:
  computer readable program code means for selecting gesture sequences responsive to said non-intentional gesture feedback;
  computer readable program code means for collectively evaluating selected gesture sequences from mobile devices identified with a group; and
  computer readable program code means for extracting resource allocation parameters from feedback evaluation results.

23. A computer program product for managing allocated cloud resources as in claim 22, wherein said computer readable program code means for evaluating evaluates non-intentional feedback information for individual mobile devices to assess and select said gesture sequences impacting resource consumption and system utilization.

24. A computer program product for managing allocated cloud resources as in claim 22, wherein said computer readable program code means for collectively evaluating collects individual feedback evaluation results for groups and evaluates the collections to assess how different group behaviors influence system load.

25. A computer program product for managing allocated cloud resources as in claim 20, further comprising computer readable program code means for a haptic capable user interfacing a mobile device with haptic sensors sensing non-intentional haptic input; said non-intentional haptic input quantifies interaction with active applications and comprising physical interaction with said mobile device including gestures, tactile manipulation, surface contact, zooming actions and tapping.

* * * * *